No. 824,234. PATENTED JUNE 26, 1906.
C. A. DAHL.
POWER TRANSMITTING MECHANISM.
APPLICATION FILED DEC. 15, 1905.
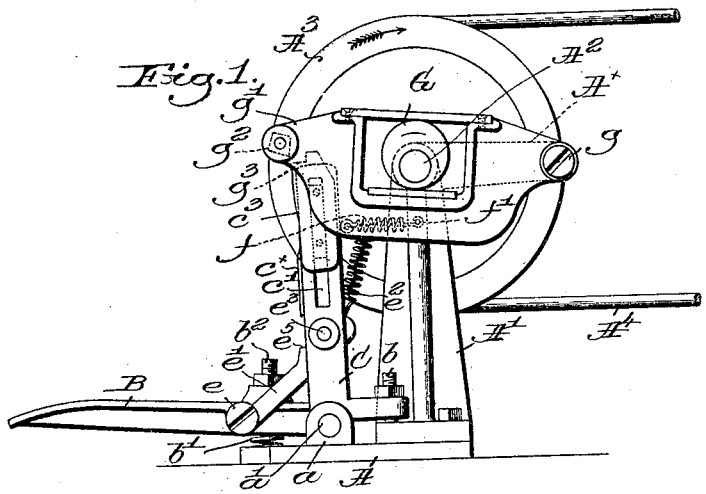
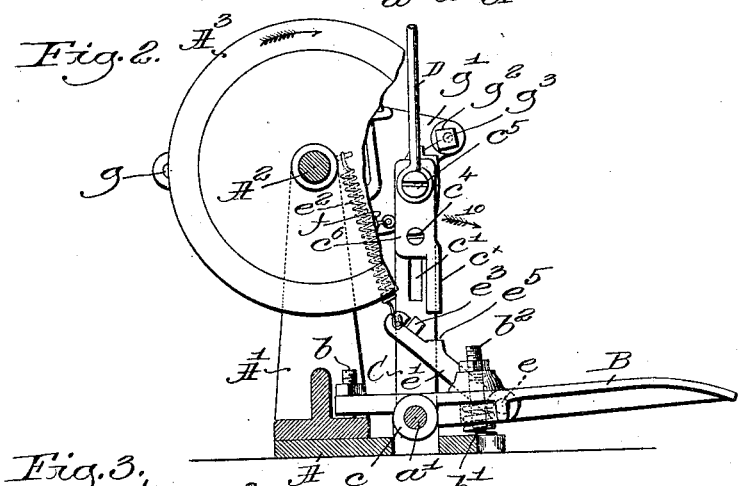

UNITED STATES PATENT OFFICE.

CHARLES A. DAHL, OF BOSTON, MASSACHUSETTS, ASSIGNOR TO THE REECE BUTTONHOLE MACHINE COMPANY, OF BOSTON, MASSACHUSETTS, A CORPORATION OF MAINE.

POWER-TRANSMITTING MECHANISM.

No. 824,234.        Specification of Letters Patent.        Patented June 26, 1906.

Application filed December 15, 1905. Serial No. 291,806.

*To all whom it may concern:*

Be it known that I, CHARLES A. DAHL, a citizen of the United States, and a resident of Boston, county of Suffolk, State of Massachusetts, have invented an Improvement in Power-Transmitting Mechanism, of which the following description, in connection with the accompanying drawings, is a specification, like letters on the drawings representing like parts.

In stitching machinery of various kinds where stop-wheels or belt-shifters are used it has been customary to start the machines either by the hand or the foot of the operator, and as long as only a few throusand manipulations a day were required the operator could stand it; but where three to four times as much work is required of the operator to keep up with the machine the strain is too much for the operator and the production of the machine to a great extent is handicapped.

To provide for the increased requirements of the operator and lessen the strain due to the increase in demand of output of the machine, I have constructed a transmitter that will perform the duty heretofore required from the operator. The transmitter, as is well known, transfers power through gearing or belting to a loose running pulley on the main shaft of the machine and the operator had to either by hand or foot move a belt-shifter and transfer the belt from a loose to a fixed pulley on the main shaft of the machine, or where clutch mechanism is used the operator had to clutch such mechanism.

In this my present invention I have provided means whereby the operator with the exertion of but a minimum of force or power through a controller, which may be a foot-plate or other usual or suitable device, may cause the continuously-moving actuator to start the belt-shifter or engage a clutch to start in motion the machine which is being attended to by the attendant. This controller may be any sort of a manually-controlled device, either a lever, push-rod, or button.

Figure 1 in end elevation represents a sufficient portion of my novel transmitter mechanism to enable the same to be understood. Fig. 2 is a sectional and broken detail looking at Fig. 1 from its opposite end. Fig. 3 is a front side elevation of the parts in Fig. 1. Fig. 4 is a sectional detail of means intermediate the usual manually-controlled lever or device and the continuously-moving actuator that may be engaged and moved through the instrumentalities of said actuator whenever the belt is to be shifted or a clutch engaged. Fig. 5 is a detail in end view of the means intermediate the manually-controlled device and the continuously-moving actuator, but occupying its operative position; and Figs. 6 and 7 are details to be referred to, they representing parts detached from Fig. 5.

For sustaining the mechanism to be hereinafter described and claimed I employ a foot-plate A, on which is erected suitable standards A', having at their upper ends bearings to receive a shaft $A^2$, on which is fixed a belt-pulley $A^3$, provided with a belt $A^4$, that is driven from a pulley on any main or counter shaft. The parts so far described are and may be of any usual or suitable construction.

The foot-plate (see Figs. 1 and 3) has suitable ears $a$, that receive a stud $a'$, on which is mounted a manually-controlled device, shown as a foot-treadle B, provided at its inner end with an adjusting device $b$ and acted upon at its under side between its fulcrum $a'$ and its outer end by a spring $b'$, also having coacting with it an adjusting device $b^2$, shown as a screw the lower end of which abuts a part of the foot-plate. The position of these two screws or adjusting devices $b\ b^2$ limits the extent of movement of the manually-controlled device B.

C designates a bodily-movable member on which is slidably mounted a slide-block $c^2$, having connected thereto a link or connection D, that extends to and is adapted to operate in any usual manner a belt-shifting mechanism or clutch-moving mechanism, such as is commonly found in sewing-machines. The slide-block $c^2$ is adapted to be moved by the bodily-movable member C, either into position to be actuated by a continuously-moving actuator or out of such position. The bodily-movable member C is moved into operative position or that position in which the slide is actuated by the constantly-moving actuator by the manually-controlled device B and is moved out of such position by means of the spring $f$, which is connected at one end to said member C and at the other end to a stud $f'$, extending from one of the uprights A'.

The constantly-moving actuator is herein illustrated as a cam or eccentric G, carried by the constantly-moving shaft $A^2$. Said actuator is herein shown as adapted to operate a lever $g'$, pivoted at one end, as at $g$, to an arm $A^\times$, extending from one of the uprights $A'$, and carrying at its other end an engaging device $g^2$, which is adapted to impinge against and engage the slide $c^2$ when it is moved into proper position by the member C.

As stated above, the slide $c^2$ is slidably mounted on the member C, and for this purpose said member is shown as slotted, as at $c'$, and the slide-block $c^2$ has a portion shaped to fit the slot, said slide-block being held to the member C by means of a plate $c^6$, which is held in position by a screw $c^4$. Said slide-block also has a stud $c^5$, to which the connection D is secured. The member C may be mounted for bodily movement in any suitable manner. I have herein shown it as pivoted on the stud $a'$, to which the foot-treadle B is pivoted.

The connection between the manually-controlled device B and the member C is made herein by a catch $e'$, which is pivoted to the treadle B, as at $e$. This catch has on its upper side a recess presenting a shoulder and is acted upon by a suitable spring $e^2$, which acts normally to keep the catch in the position shown in Fig. 2. The recess in this catch is adapted to receive a lug $e^3$, extending from the member C. The lower end of the plate $c^6$ has a projection $c^\times$, that at times, as will be described, meets the abutment $e^5$, forming part of the catch $e'$, and depresses said catch to disengage the latter from the projection $e^3$.

Assuming that the parts as shown in Figs. 1 and 2 occupy their inoperative position and that the pulley $A^3$ is being revolved continuously in the direction of the arrow thereon, it will be understood that the continuously-moving actuator will be moved in the same direction and that said actuator will move up and down the free end of the lever $g'$, but at such time the engaging device $g^2$ will do no work.

Now to start whatever machine is to be started and stopped through the instrumentalities of the transmitter herein described the operator will turn the manually-controlled device B, depressing its outer end sufficiently to cause the shoulder of the catch, which is almost in contact with a projection $e^3$, to meet said projection and turn the arm C outwardly in the direction of the arrow 10, Fig. 2, against the stress of the spring $f$ to cause the notched upper end of the portion $c^3$ of the slide-plate $c^2$ to be put in the path of movement of the engaging device $g^2$, and immediately said device moves the slide in the slot $c'$, causing the latter in its downward movement to depress or pull upon the link D sufficiently to move any usual belt-shipper to be moved to transfer whatever belt is employed to actuate the machine to be started, to be shifted from the usual loose pulley onto the fast pulley, or to close whatever clutch of any usual construction that is employed to start the machine. As the belt is transferred from the loose to the fast pulley or after the clutch is engaged the continued downward movement of the slide $c^2$ causes the end $c^\times$ thereof to meet the abutment $e^5$ of the catch and depress the same, straining the spring $e^2$ sufficiently to disengage the projection $e^3$ and let the spring $f$ act instantly to remove the portion $c^3$ of the lever C out of the range of movement of the engaging device $g^2$; and thereafter the sewing or other machine which is being driven may be run continuously.

It will be supposed that the machine being driven by the transmitter has some suitable means for stopping it whenever desired, the means herein shown being employed chiefly for starting the machine. One depression or movement of the manually-controlled device B will effect the starting of the machine, whose movement is to be controlled through the transmitter, and it is immaterial thereafter whether the operator keep her foot on the device B or remove the foot. It will be understood from the foregoing description that the operator has to exert only sufficient power to depress the spring $b'$ for a short distance or just enough to move the catch so that a projection of the catch will turn the arm C a little to the right, Fig. 2, and the power required to turn downwardly the arm C is only sufficient to overcome the very slight spring $f$, so that the operator can start the machine with the expenditure of but a minimum of power, and this may be repeated as many times as required without fatiguing the operator, whereas with other transmitters known to me it is necessary to overcome the pressure of very strong springs, requiring the exertion of considerable force or power on the part of the operator, which makes the work very tiresome. The transmitter herein described is therefore a very great assistance to an operator, and its use results in very much reducing the fatigue of the operator in running a sewing or other machine.

The drawings illustrate one embodiment only of my invention, and it will be obvious that the bodily-movable member C and the constantly-moving actuator may assume different shapes and have different arrangements without departing from the invention.

I have hereinbefore stated that the manually-controlled device B might be of any usual construction—that is, I might use a pin or any other suitable sliding device under the control of either the foot or hand of an operator that might be moved to cause the arm C to be turned from its inoperative position, Figs. 1 and 2, into its operative position, Fig. 3—and I consider whatever device should be used for this purpose as a full equivalent of the manually-controlled device, (designated B.)

Having fully described my invention, what I claim as new, and desire to secure by Letters Patent, is—

1. In apparatus of the class described, a continuously-moving actuator, a bodily-movable member, a slide carried by and movable on the bodily-movable member, said slide being connected to the device to be operated, and means to move said member bodily to put the slide into position to be actuated by the actuator.

2. In a device of the class described, a continuously-moving actuator, a bodily-movable member, a slide slidably mounted thereon and connected to the device to be operated, means tending normally to hold said member in a position in which the slide is not actuated by said actuator, and manually-controlled means to move the member into a position in which the slide is actuated by the actuator.

3. In a device of the class described, a continuously-moving actuator, a pivoted arm, a slide carried by the arm and slidably mounted thereon, said slide being connected to the device to be operated, and a manually-controlled means to swing said arm into a position in which the slide is actuated by the actuator.

4. In a device of the class described, a continuously-moving actuator, a lever continuously operated thereby, a swinging arm, a slide carried by and slidably mounted thereon, means acting normally to retain said arm in its inoperative position, and a manually-controlled device to turn said arm in its operative position to bring the slide into position to be actuated by the lever.

5. In apparatus of the class described, an arm having a projection, a slide mounted thereon and having a projection, a catch coacting normally with the projection of said arm to retain the latter with its slide in its inoperative position, means to move said catch and said arm that the arm may be put into its operative position, and means to thereafter move said slide, the latter in its movement releasing said catch.

In testimony whereof I have signed my name to this specification in the presence of two subscribing witnesses.

CHARLES A. DAHL.

Witnesses:
FREDERICK W. DAVISON,
THOMAS J. CARTY.